UNITED STATES PATENT OFFICE.

PAUL E. FLOARE, OF KANSAS CITY, MISSOURI.

PROCESS OF MAKING FOOD FROM SPENT YEAST.

1,207,012.

Specification of Letters Patent. Patented Dec. 5, 1916.

No Drawing. Application filed July 7, 1915. Serial No. 38,498.

*To all whom it may concern:*

Be it known that I, PAUL E. FLOARE, a subject of the Emperor of Austria-Hungary, residing at Kansas City, in the county of Jackson and State of Missouri, have invented certain new and useful Improvements in Processes of Making Foods from Spent Yeast; and I do hereby declare the following to be a full, clear, and exact description of the invention, such as will enable others skilled in the art to which it appertains to make and use the same.

This invention relates to foods and method of making the same.

The object of the invention is, in a ready, practical, and thoroughly feasible manner, to utilize spent yeast, a by-product in the fermentation of malts and grain in brewing and distillation, in the production of a valuable food product for consumption by the human and brute creation, and further in employing such by-product in the production of vanilla and cider, and to augment, to a marked degree, the percentage of butter-fat in milk, whereby the products resulting from the various processes followed in the production of dairy food stuffs will possess added richness and increased food values without material advance in cost of their manufacture.

The prime object of my invention is to utilize the spent yeast, a substance or residue devoid of the spores and germs of fermentation and consisting half and half of corn germ bran and corn meal resulting from brewery and distillery operations and converting the same into food substance. This is accomplished by providing a tank of a size to contain from five hundred to six hundred gallons, which tank is to be provided with a suitable agitator or dasher for mixing the product with the water in the tank. In cleansing the product or yeast from all residual ferment, a quantity of water is placed in the tank and a certain amount of waste product or yeast entered therein, after which a suitable amount of air is compressed within the tank and the agitator or dasher rotated a predetermined time for thoroughly commingling the waste product with the water, the agitator being operated for approximately ten minutes. After the operation of the agitator has been stopped for at least fifteen minutes, or a sufficient time to permit the waste products to settle to the bottom of the tank, the water is withdrawn from the tank through faucets which are placed one above the other several inches apart, the uppermost faucet being first opened until the water has been drained to its level, then the next succeeding faucet is opened and so on until all the water has been removed from the waste products. The compressed air in the tank not only serves to force the water through all parts of the waste product when the product is being agitated but also serves to force the water through the faucets as said faucets are opened, it being understood of course that when the water has been forced out to a level with the first faucet, said faucet is closed and the next faucet opened, and in view of employing the compressed air, the waste product will be much more thoroughly drained and more thoroughly and quickly dried. A new supply of water and air is then introduced into the tank and the above operation repeated and so on until all of the residual ferment, or other foreign substances, have been removed. The waste product or yeast is then removed from the tank and subjected to pressure, the same being exposed to the air a predetermined length of time, while being drained or filtered and also during the process of drying, a Kelley press, Patent No. 815,021 and later patents, being preferably used as superior results may thus be accomplished. After the product is freed of any residual ferment, a comminuted or finely divided vegetable product, such as corn meal, or the like, is mixed with the substance thus obtained, thus rendering the same palatable for consumption by animals.

In order to increase the richness of this food when used for feeding milk cows, a due proportion of finely cleansed and ground cocoa hulls or shells may be added to the mixture which will result in increasing the richness of the milk, as well as the butter fat produced.

When the product is to be used for human consumption, any suitable saccharine material, such as sugar, or the like, may be added to the mixture of yeast and corn meal, thus rendering the same very palatable, especially as a breakfast food.

When the yeast is taken from the press, it is in a dry cake formation and is to be ground properly before the corn meal or other substances are commingled therewith. The yeast products and corn meal are mixed together preferably in equal proportions.

What I claim is:—

1. A method of producing artificial food consisting in taking spent yeast resulting from brewery and distillery operations, placing the same in an air tight vessel, adding thereto a quantity of water and filling the remainder of the vessel with compressed air, agitating the contents a prescribed time and permitting the same to settle for a prescribed time, then drawing off the water and repeating the above operation until the product is free of all ferment and inherent impurities, then removing the product from the vessel and draining or filtering the same while exposed to the air, then subjecting the same to pressure and mixing therewith comminuted particles of corn meal, said products being mixed in equal quantities.

2. A method of producing artificial food consisting in taking spent yeast resulting from brewery and distillery operations, placing the same in an air tight vessel, adding thereto a quantity of water and filling the remainder of the vessel with compressed air, agitating the contents a prescribed time, then drawing off the water and repeating the above operation until the product is free of all ferment and inherent impurities then removing the product from the vessel and draining or filtering the same while exposed to the air, then subjecting the same to pressure and mixing therewith comminuted particles of corn meal, said products being mixed in equal quantities, and adding thereto finely ground cocoa hulls or shells.

3. A method of producing artificial food consisting in taking spent yeast resulting from brewery and distillery operations, placing the same in an air tight vessel, adding thereto a quantity of water and filling the remainder of the vessel with compressed air, agitating the contents a prescribed time and permitting the same to settle for a prescribed time, then drawing off the water and repeating the above operation until the product is free of all ferment and inherent impurities, then removing the product from the vessel and draining or filtering the same while exposed to the air, then subjecting the same to pressure and mixing therewith comminuted particles of corn meal, said products being mixed in equal quantities, and adding thereto a saccharine material when served as human food.

4. A method of producing artificial food consisting in taking spent yeast resulting from brewery and distillery operations, placing the same in an air tight vessel, adding thereto a quantity of water and filling the remainder of the vessel with compressed air, agitating the contents a prescribed time and permitting the same to settle, then drawing off the water and air and repeating the above operation until the product is free of all ferment and inherent impurities, then removing the product from the vessel and draining or filtering the same while exposed to the air, then subjecting the same to pressure and mixing therewith comminuted particles of corn meal, cocoa hulls or shells, and a saccharine material, when served as food.

In testimony whereof I have signed my name to this specification in the presence of two subscribing witnesses.

PAUL E. FLOARE.

Witnesses:
HARRY L. WINTSCH,
CHAS. B. WALTER.